(12) United States Patent
Baettig et al.

(10) Patent No.: US 8,361,168 B2
(45) Date of Patent: Jan. 29, 2013

(54) BLACK TRISAZO DYES, THEIR PREPARATION AND THEIR USE

(75) Inventors: Kurt Baettig, Le Mouret (CH); Damien Moigno, Marly (CH)

(73) Assignee: ILFORD Imaging Switzerland GmbH

( * ) Notice: Subject to any disclaimer, the term of this patent is extended or adjusted under 35 U.S.C. 154(b) by 0 days.

(21) Appl. No.: 13/335,219

(22) Filed: Dec. 22, 2011

(65) Prior Publication Data

US 2012/0159719 A1 Jun. 28, 2012

(30) Foreign Application Priority Data

Dec. 22, 2010 (EP) .................................... 10196679

(51) Int. Cl.
*D06P 1/02* (2006.01)
*C09D 11/00* (2006.01)

(52) U.S. Cl. ............. 8/466; 8/638; 8/639; 8/640; 8/687; 106/31.48

(58) Field of Classification Search .............. 8/466, 638, 8/639, 640, 687; 106/31.48
See application file for complete search history.

(56) References Cited

U.S. PATENT DOCUMENTS

| 2,220,396 A | 11/1940 | Crossley et al. |
| 4,626,284 A | 12/1986 | Ohta et al. |
| 2002/0017218 A1 | 2/2002 | Baettig et al. |
| 2002/0121221 A1 | 9/2002 | Baettig |

FOREIGN PATENT DOCUMENTS

| EP | 0176195 | 4/1986 |
| EP | 0415581 | 3/1991 |
| EP | 0425150 | 5/1991 |
| EP | 0597672 | 5/1994 |
| EP | 0755984 | 1/1997 |
| EP | 1219682 | 7/2002 |
| EP | 1693 422 A1 * | 8/2006 |
| EP | 1693422 | 8/2006 |
| EP | 1777273 | 4/2007 |
| GB | 2289473 | 11/1995 |
| JP | 2005220211 | 8/2005 |
| WO | WO9624635 | 8/1996 |
| WO | WO9624636 | 8/1996 |
| WO | WO2005054374 | 6/2005 |

OTHER PUBLICATIONS

STIC Search Report dated Aug. 27, 2012.*

* cited by examiner

*Primary Examiner* — Eisa Elhilo
(74) *Attorney, Agent, or Firm* — Onofrio Law; Dara L. Onofrio, Esq.

(57) ABSTRACT

1. Trisazo dyes of general formula (IV) and of general formula (V)

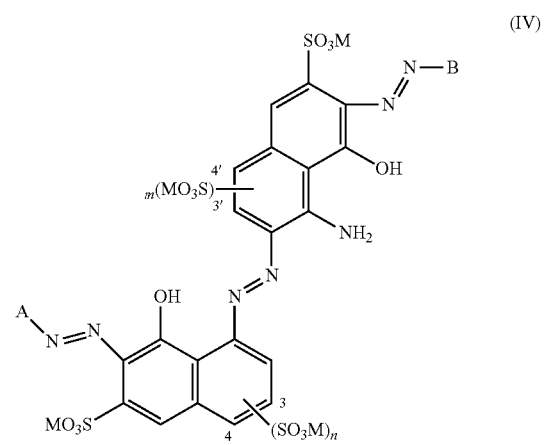

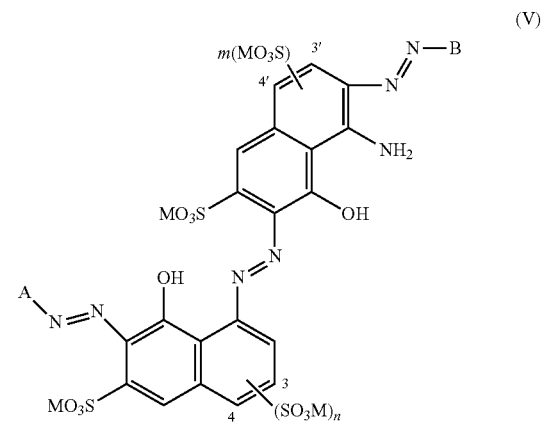

wherein A, B, M, $R_1$ to $R_{18}$, m, n, o and p are as described in the specification, are excellent black dyes for dyeing and printing of paper, other cellulose containing materials and textiles materials and, in particular, for the preparation of recording liquids for ink jet printing and for writing utensils.

12 Claims, No Drawings

BLACK TRISAZO DYES, THEIR PREPARATION AND THEIR USE

FIELD OF THE INVENTION

The invention relates to novel black trisazo dyes and their salts, a method of their preparation and their use in dying and printing operations. It also relates to liquid dye preparations containing these trisazo dyes, in particular to aqueous recording fluids for ink jet printing and for writing utensils.

BACKGROUND OF THE INVENTION

The speed of modern ink jet printers has to increase steadily for economic reasons. Particularly suitable recording sheets for such printers comprise nanoporous inorganic compounds such as for example silicium dioxide, aluminum oxide/hydroxide, aluminum oxide or their mixtures. Such recording sheets are known as "nanoporous recording sheets". Images printed onto these recording sheets need to have a good storage stability even under adverse conditions. This can only be achieved by using a finely tuned system of inks, respectively the dyes contained therein.

Up to now, these images do not satisfy all required properties. In particular, the water fastness, the light stability, the ozone stability, the hue and the brilliance of images printed onto these recording sheets are not satisfactory. Thus, new dyes are looked for which would improve the properties mentioned above of images printed onto these recording sheets, in particular in areas with black hue.

Although quite a number black dyes have already been proposed as black dyes for ink jet printing. However, none satisfies all of the required properties.

The trisazo dye of formula (I)

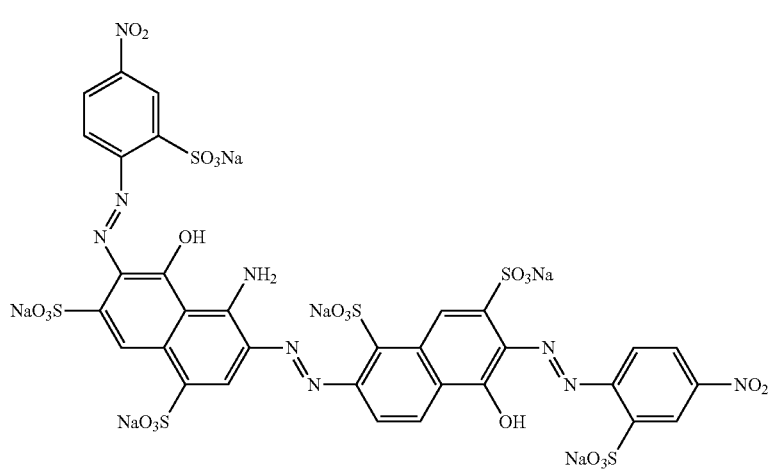

is described in patent application WO 2005/054,374 (example 1-5).

The trisazo dye of formula (II)

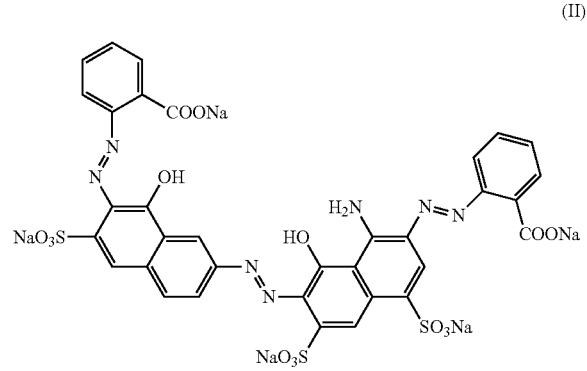

is described in patent application WO 2005/054,374 (comparative example 1-2).

The trisazo dye of formula (III)

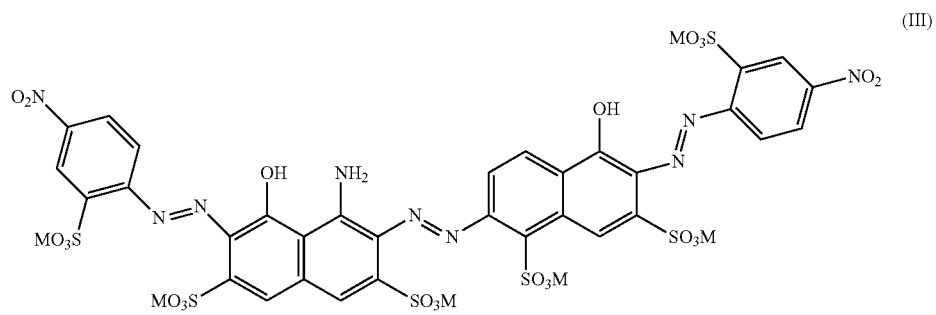

is described in patent application JP 2005/220'211 (compound no. 17).

These trisazo dyes, representing the state of the art, do not satisfy all the required demands if they are used in the formulation of recording liquids for ink jet printing that should provide images having a good stability even under adverse conditions on rapidly drying nanoporous recording sheets. Evidently, they also need to give black image regions or colorings having an as far as possible neutral black hue (values of $L^*a^*b^*$ with the lowest possible values of $a^*$ and $b^*$) on any other type of recording sheet such as plain or coated paper, coated or uncoated, opaque or transparent synthetic materials.

Dyes used for the preparation of such inks need to have a good solubility in the essentially aqueous ink liquid, they have to penetrate into the recording sheet and should not show dye aggregation on the surface of the recording sheet ("bronzing"). They need to provide printed images having high optical density, good water fastness, good light stability, good ozone fastness and good diffusion fastness even under adverse conditions. They need to be stable in the ink even when the ink is stored for a long time under adverse conditions.

Various types of ink compositions have been proposed. Typical inks comprise one or more dyes or pigments, water, organic co-solvents and other additives.

The inks have to satisfy the following criteria:
(1) The ink gives images of excellent quality on any type of recording sheet.
(2) The ink gives printed images exhibiting good water fastness.
(3) The ink gives printed images exhibiting good light stability.
(4) The ink gives printed images exhibiting good ozone fastness.
(5) The ink gives printed images exhibiting excellent smudge behavior.
(6) The ink gives printed images exhibiting excellent storage stability under conditions of high temperature and humidity.
(7) The ink does not clog jetting nozzles of the ink jet printers even when these are kept uncapped while recording is suspended for long periods.
(8) The ink may be stored for long periods without deterioration of its quality.
(9) The ink has to be non-toxic, non-flammable and safe.

SUMMARY OF THE INVENTION

An objective of the invention is the provision of novel black trisazo dyes with black, as far as possible neutral hue and their use in aqueous inks, in particular in recording fluids for ink jet printing and for writing utensils. They are particularly advantageous in ink jet printing for the preparation of images or colorings on rapidly drying nanoporous recording sheets. These novel black trisazo dyes with high coloring strength have an excellent solubility in aqueous formulations, they give images or colorings having good overall properties, in particular in ink jet printing, where they provide images with brilliant hue, where the sharpness of the images is not or only slightly deteriorated during long periods of storage under conditions of high temperature and humidity. The images also show good light stability and excellent ozone fastness.

A further objective of the invention is the provision of liquid dye preparations, in particular of inks for ink jet printing and for writing utensils, giving a spectrally unchanged hue on any type of recording sheet.

A further objective of the invention is the provision of inks having all the required properties mentioned before.

A DETAILED DESCRIPTION OF THE INVENTION

The present invention relates to novel trisazo dyes of general formula (IV)

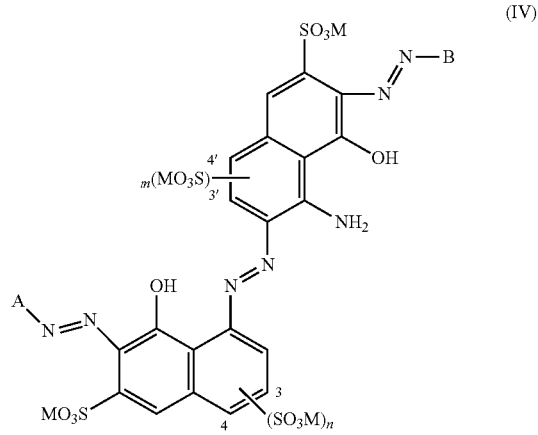

and of general formula (V)

(V)

[Structure of formula (V) showing a trisazo dye with naphthalene rings bearing $MO_3S$, $OH$, $NH_2$ groups, azo linkages to substituents A and B, and sulfonate groups $m(MO_3S)$ and $(SO_3M)_n$]

where
M represents a hydrogen atom, a metal cation or an ammonium cation, which optionally may be substituted by one or more alkyl or substituted alkyl groups each having from 1 to 18 C atoms;
m, n independently are 0 or 1;
A either represents a moiety of general formula (VI)

(VI)

[Structure showing a benzene ring with substituents $R_6$, $R_7$, $R_8$, $R_9$, $R_{10}$]

where
$R_6$, $R_7$, $R_8$, $R_9$, $R_{10}$ independently represent a hydrogen atom, a $SO_3M$ group, a $NO_2$ group, a COOM group, a CN group, a halogen atom, an ester group, an alkyl or alkoxyl group each having from 1 to 6 carbon atoms, an unsubstituted or substituted amide or sulfonamide group each having up to 12 carbon atoms, wherein the substituents are selected from the group consisting of COOM, OH, $OCH_3$, $NH_2$, Cl, $COOCH_3$ and $COOCH_2CH_3$;
or a moiety of general formula (VII)

(VII)

[Structure showing a naphthalene ring with substituents $R_{11}$, $R_{12}$, $R_{13}$, $R_{14}$, and $o(MO_3S)$]

where
o is 0 or 1 and
$R_{11}$, $R_{12}$, $R_{13}$, $R_{14}$ independently represent a hydrogen atom, a $SO_3M$ group, a $NO_2$ group, a COOM group, a halogen atom, an ester group, an alkoxyl group having from 1 to 6 carbon atoms, an unsubstituted or substituted amide or sulfonamide group each having up to 12 carbon atoms, wherein the substituents are selected from the group consisting of COOM, OH, $OCH_3$, $NH_2$, Cl, $COOCH_3$ and $COOCH_2CH_3$
and
B either represents a moiety of general formula (VIII)

(VIII)

[Structure showing a benzene ring with substituents $R_1$, $R_2$, $R_3$, $R_4$, $R_5$]

where
$R_1$, $R_2$, $R_3$, $R_4$, $R_5$ independently represent a hydrogen atom, a $SO_3M$ group, a $NO_2$ group, a COOM group, a CN group, a halogen atom, an ester group, an alkyl or alkoxyl group each having from 1 to 6 carbon atoms, an unsubstituted or substituted amide or sulfonamide group each having up to 12 carbon atoms, wherein the substituents are selected from the group consisting of COOM, OH, $OCH_3$, $NH_2$, Cl, $COOCH_3$ and $COOCH_2CH_3$;
or a moiety of general formula (IX)

(IX)

[Structure showing a naphthalene ring with substituents $R_{15}$, $R_{16}$, $R_{17}$, $R_{18}$, and $p(MO_3S)$]

where
P is 0 or 1
and
$R_{15}$, $R_{16}$, $R_{17}$, $R_{18}$ independently represent a hydrogen atom, a $SO_3M$ group, a $NO_2$ group, a COOM group, a halogen atom, an ester group, an alkoxyl group having from 1 to 6 carbon atoms, an unsubstituted or substituted amide or sulfonamide group each having up to 12 carbon atoms, wherein the substituents are selected from the group consisting of COOM, OH, $OCH_3$, $NH_2$, Cl, $COOCH_3$ and $COOCH_2CH_3$.

Preferred are trisazo dyes of general formulas (IV) and (V), wherein M, and p are as defined before,
$R_1$, $R_2$, $R_3$, $R_4$, $R_5$ independently represent a hydrogen atom, a $SO_3M$ group, a $NO_2$ group, a COOM group, a CN group, a halogen atom, an ester group, an alkyl or alkoxyl group each having from 1 to 6 carbon atoms;
$R_6$, $R_7$, $R_8$, $R_9$, $R_{10}$ independently represent a hydrogen atom, a $SO_3M$ group, a $NO_2$ group, a COOM group, a CN group, a halogen atom, an ester group, an alkyl or alkoxyl each group having from 1 to 6 carbon atoms;
$R_{11}$, $R_{12}$, $R_{13}$, $R_{14}$ independently represent a hydrogen atom, a halogen atom, a $SO_3M$ group or a COOM group;
$R_{15}$, $R_{16}$, $R_{17}$, $R_{18}$ independently represent a hydrogen atom, a halogen atom, a $SO_3M$ group or a COOM group
and
m, n are 1.

Particularly preferred are trisazo dyes of general formulas (IV) and (V), wherein $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, $R_{18}$, M, o and p are as defined before and the sulfonic acid groups are in positions 4 and 4'.

Particularly preferred are trisazo dyes of general formulas (IV) and (V), wherein A is a moiety of general formula (VI) and B is a moiety of general formula (VIII).

Also preferred are trisazo dyes of general formulas (IV) and (V), wherein the moieties A and B are identical.

As metal cations, the cations of the alkali metals (Li, Na, K, Rb, Cs), of the alkaline earth metals (Mg, Ca, Sr, Ba) and the ammonium cation, optionally substituted by one or more alkyl groups having each from 1 to 4 carbon atoms or by hydroxy substituted alkyl each having from 1 to 6 carbon atoms are preferred.

Specific examples of trisazo dyes of general formula (IV) are the following, where the substituent M is defined in Table 1.

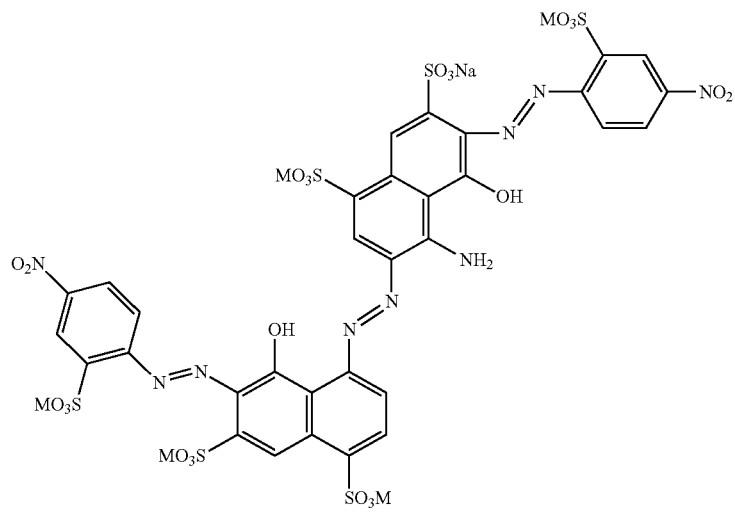

(10)

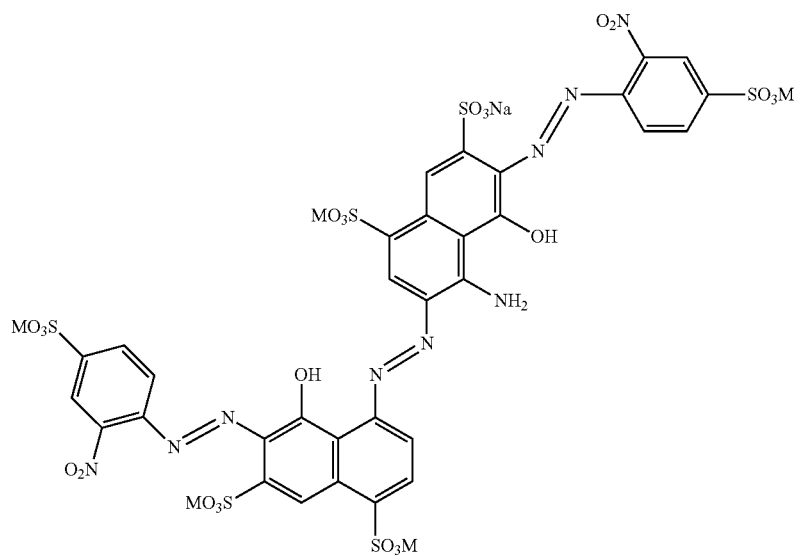

(11)

-continued
(12)
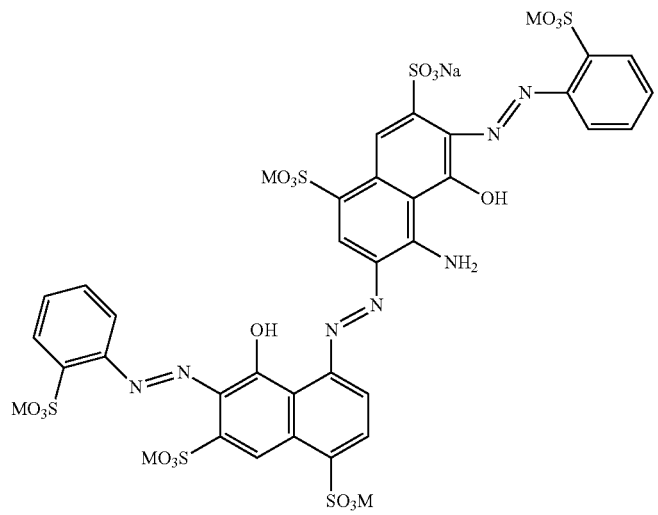
(13)
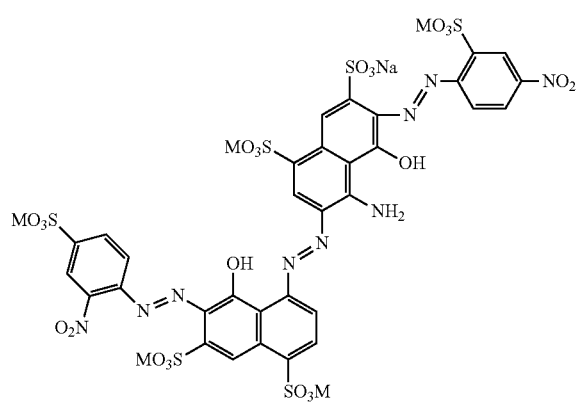
(14)
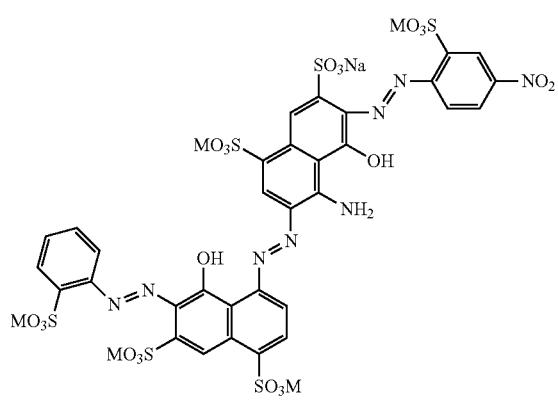
(15)
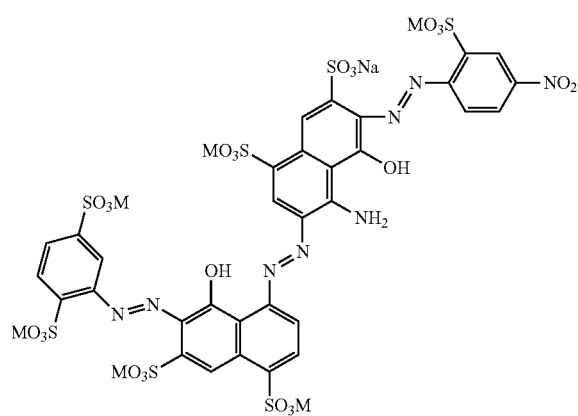
(16)
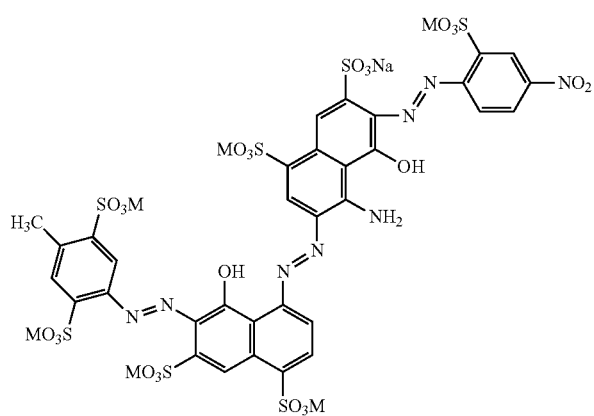

-continued
(17)
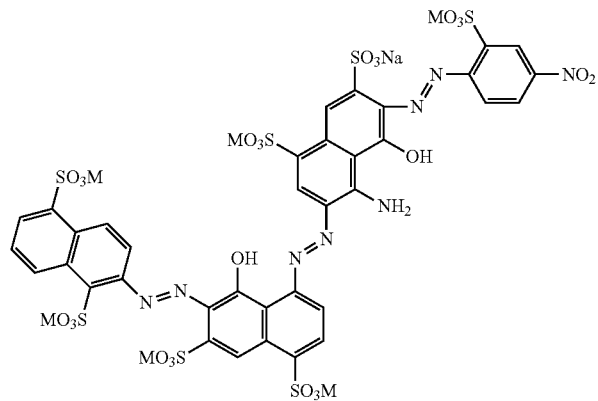
(18)
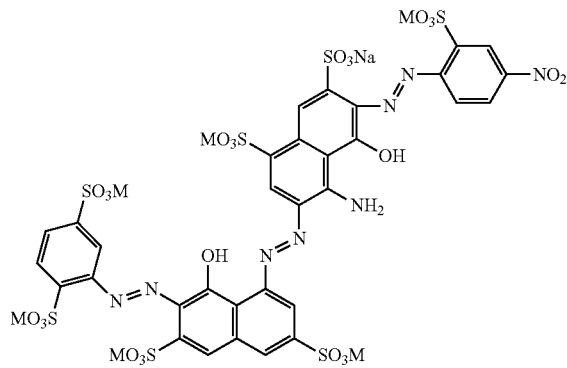
(19)
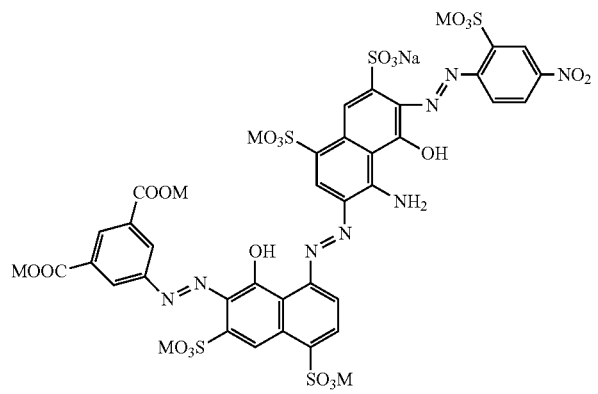
(20)
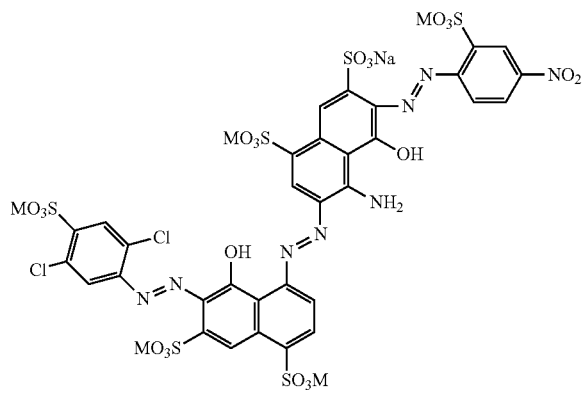
(21)
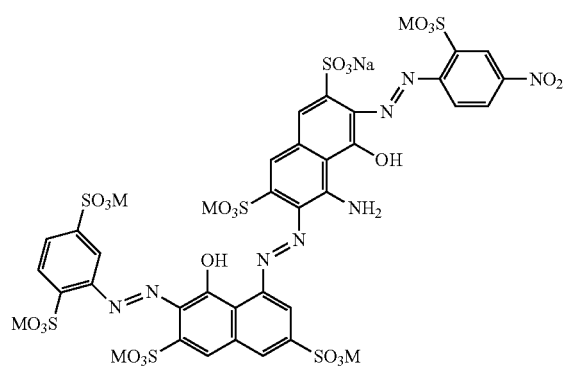
(22)
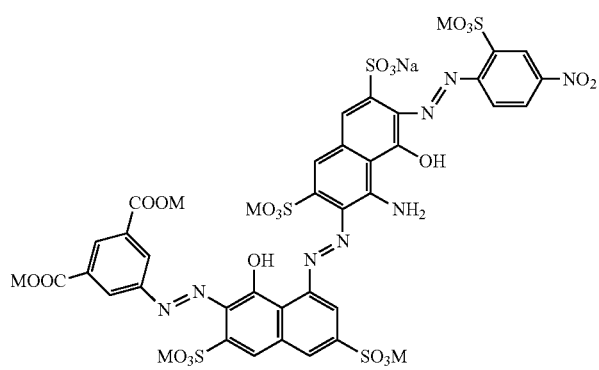
(23)
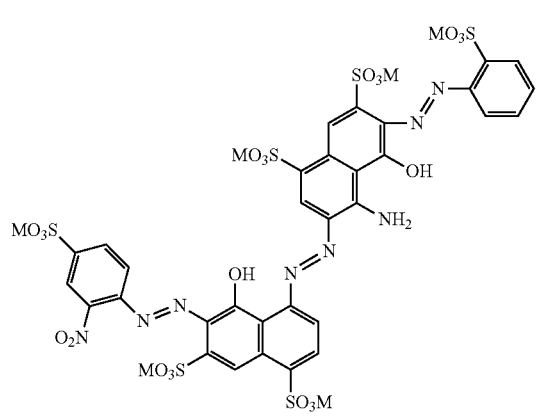
(24)
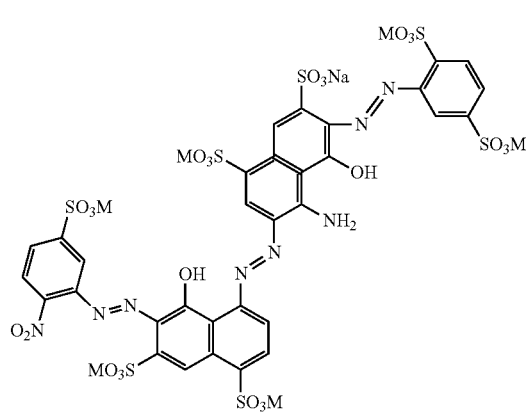

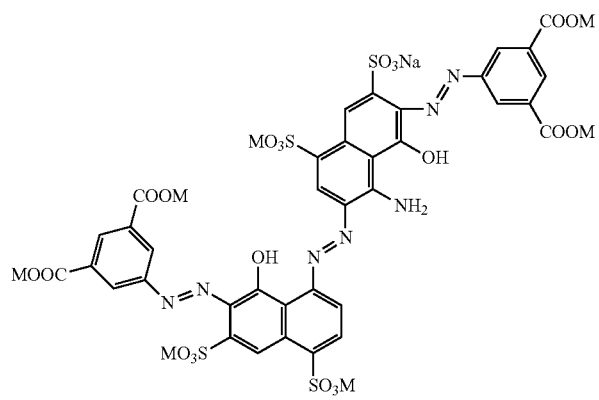
(25)
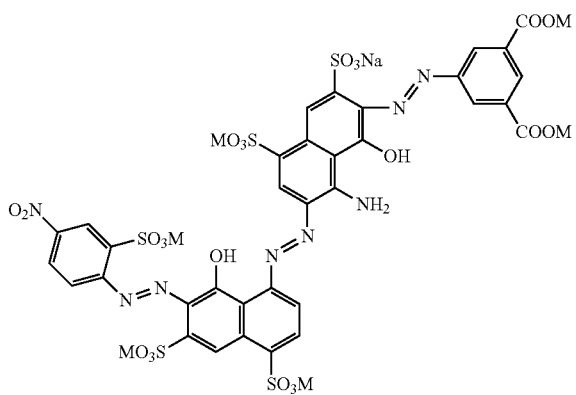
(26)
Specific examples of trisazo dyes of general formula (V) are the following, where the substituent M is defined in Table 1.
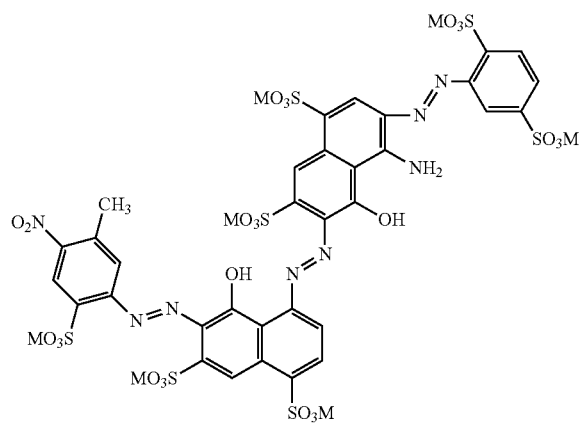
(30)
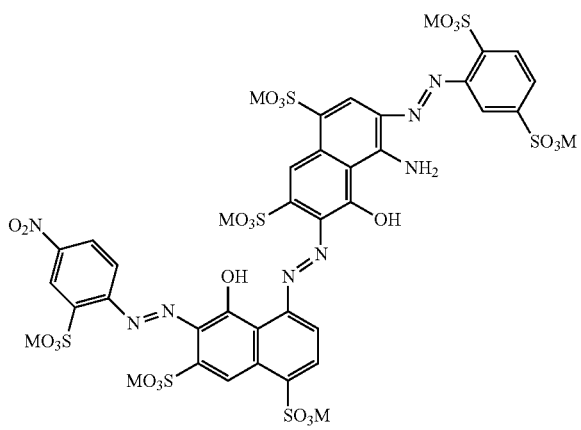
(31)
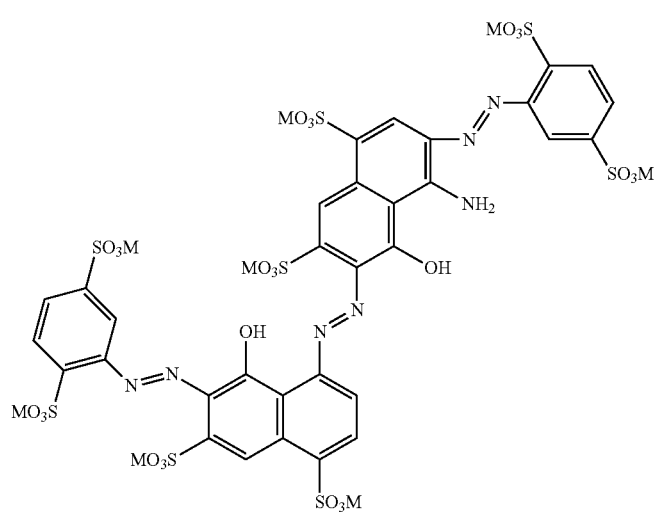
(32)

-continued

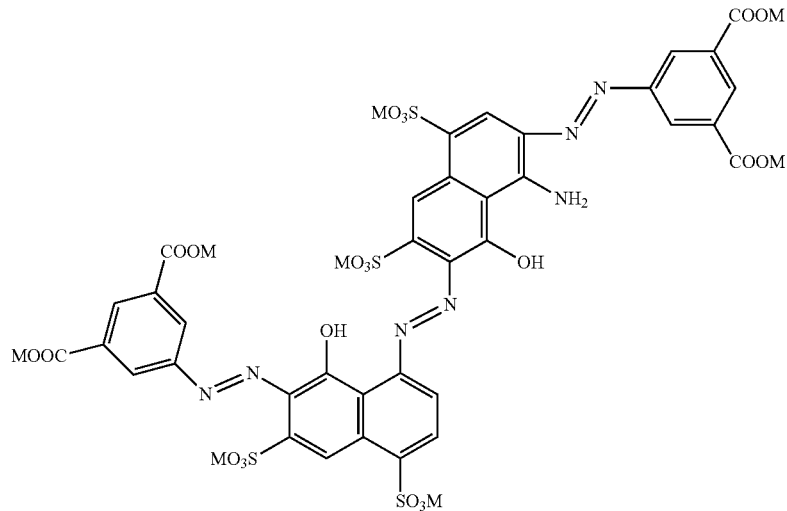

(33)

The prepared trisazo dyes of general formulas (IV) and (V) are listed in Table 1 together with their absorption maximum in aqueous solution:

TABLE 1

| Dye no. | M | $\lambda_{max}$ in H$_2$O (nm) |
| --- | --- | --- |
| 10 | Na | 499 |
| 11 | Na | 501 |
| 12 | Na | 502 |
| 13 | K | 507 |
| 14 | Li | 505 |
| 15 | Na | 497 |
| 16 | Na | 509 |
| 17 | Na | 509 |
| 18 | Na | 508 |
| 19 | Na | 595 |
| 20 | Na | 507 |
| 21 | Na | 511 |
| 22 | Na | 500 |
| 23 | Na | 500 |
| 30 | Na | 509 |
| 31 | Na | 514 |
| 32 | Na | 501 |
| 33 | K | 498 |

The trisazo dyes of general formulas (IV) and (V) may be in the free acid form or in the form of inorganic or organic salts thereof. Preferably, they are in the form of their alkali or ammonium salts, wherein the ammonium cation may be substituted. Examples of such substituted ammonium cations are 2-hydroxyethylammonium, bis-(2-hydroxyethyl)-ammonium, tris-(2-hydroxyethyl)-ammonium, bis-(2-hydroxyethyl)-methylammonium, tris-[2-(2-methoxyethoxy)-ethyl]-ammonium, 8-hydroxy-3,6-dioxaoctylammonium and tetraalkylammonium such as tetramethylammonium or tetrabutylammonium.

The invention does not only relate to pure trisazo dyes of general formulas (IV) and (V), but also to mixtures of these trisazo dyes.

The invention also relates to a method of preparation of the trisazo dyes of general formula (IV) according to the invention, wherein an amine of general formula (X),

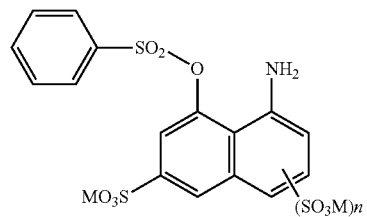

(X)

where n and M are as defined before, is diazotized and subsequently coupled with a compound of general formula (XI),

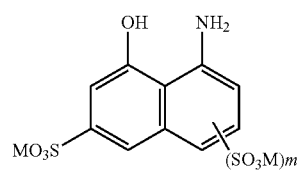

(XI)

where m and M are as defined before, at an acid value of pH situated between about 1.0 and 3.0 under formation of the intermediate dye of general formula (XII).

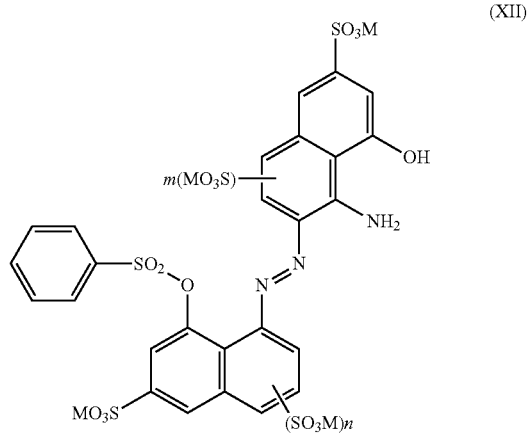

(XII)

The intermediate dye of general formula (XII) is further coupled with a diazo compound of general formula (XIII),

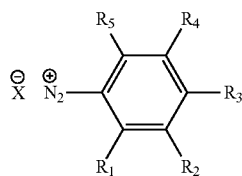
(XIII)

where $R_1$, $R_2$, $R_3$, $R_4$ and $R_5$ are as defined before and X is the anion of the acid used during diazotization, or of general formula (XIV)

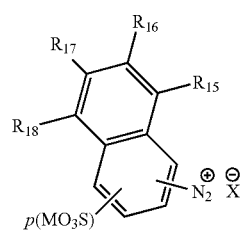
(XIV)

where $R_{15}$, $R_{16}$, $R_{17}$, $R_{18}$ and p are as defined before and X is the anion of the acid used during diazotization, at a slightly basic value of pH between situated between about 7.0 and 9.0 and hydrolyzed subsequently under basic conditions under formation of the intermediate dyes of general formula (XV)

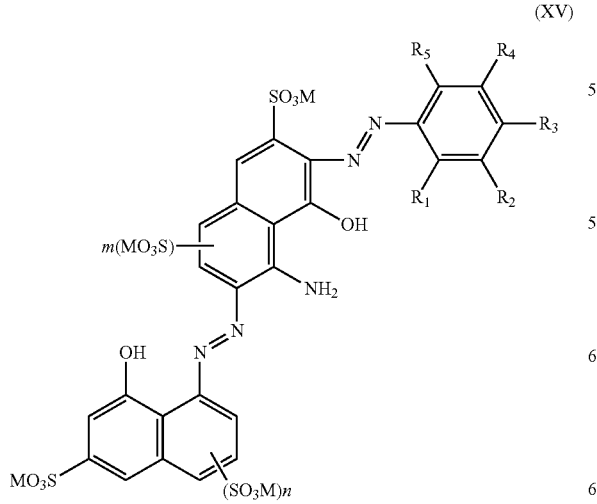
(XV)

or of general formula (XVI)

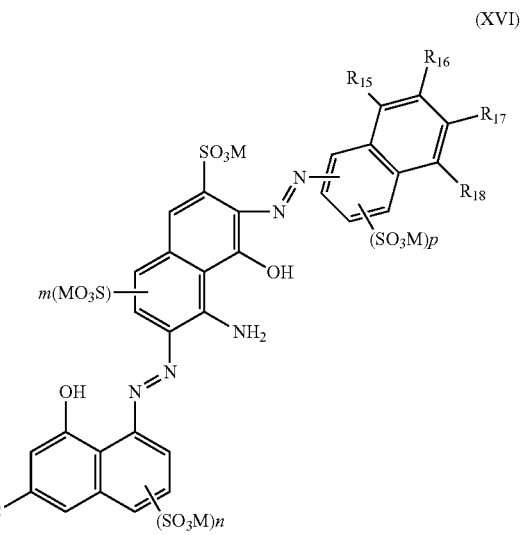
(XVI)

These intermediate dyes of general formulas (XV) or (XVI) are subsequently coupled with a diazo compound of general formula (XVII)

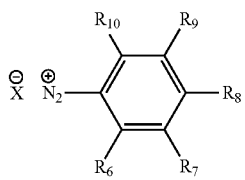
(XVII)

where X, $R_6$, $R_7$, $R_8$, $R_9$ and $R_{10}$ are as defined before, or of general formula (XVIII)

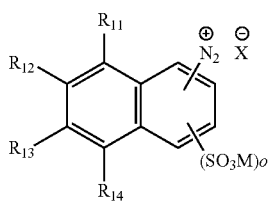
(XVII)

where X, o, $R_{11}$, $R_{12}$, $R_{13}$ and $R_{14}$ are as defined before, at a more or less neutral value of pH situated between about 5.0 and 9.0 under formation of the dyes of general formula (IV) according to the invention.

The invention further also relates to a method of preparation of the trisazo dyes of general formula (V) according to the invention, wherein an amine of general formula (XIX)

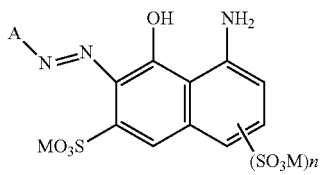

where M, A and n are as defined before, is diazotized and subsequently coupled with a compound of general formula (XX)

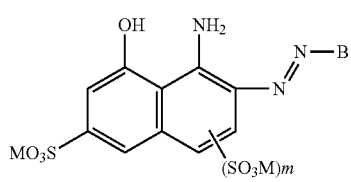

where M, B and m are as defined before, at a slightly basic value of pH between situated between about 7.0 and 9.0 under formation of the dyes of general formula (V) according to the invention.

The trisazo dyes of general formulas (IV) and (V) according to the invention are used for dying cellulose containing materials, paper, cotton, viscose, leather and wool to provide dyed materials with good water fastness and light stability.

All methods well known in the textile and paper industries for dyeing with substantive dyes may be used with the trisazo dyes, preferably for the bulk or surface treatment of sized or unsized paper. The dyes may also be used in the dyeing of yarns and piece goods of cotton, viscose and linen by the exhaustion process from a long liquor or in a continuous process.

The trisazo dyes according to the invention are particularly suitable for recording text and images on recording sheets, coated or uncoated paper, for dyeing or printing of natural or synthetic fiber materials, nanoporous recording sheets, leather and aluminum.

The invention furthermore relates to liquid dye preparations comprising at least one trisazo dye of general formulas (IV) or (V). The use of such liquid dye preparations is particularly preferred for paper dyeing. Such stable, liquid, preferably aqueous, concentrated dye preparations may be obtained by using methods well known in the art, preferably by dissolving in suitable solvents. The possibility of preparation of such stable, aqueous, concentrated preparations in the course of dye synthesis itself, without intermediate isolation of the dye, for example after a desalting step by diafiltration of the reaction solution, is of particular advantage.

Trisazo dyes or mixtures of trisazo dyes of general formulas (IV) and (V) are excellent dyes for the preparation of inks for ink jet printing and for writing utensils.

The trisazo dyes of general formulas (IV) and (V) according to the invention may be combined with toning dyes, in particular dyes as described in patent applications EP 0,755, 984, EP 1,219,682, WO 96/24,635 and WO 96/24,636 in order to obtain a still more neutral black hue.

Such an ink comprises one or more of the trisazo dyes according to the invention in a liquid aqueous medium. The ink contains from 0.5 percent by weight to 20 percent by weight, preferably from 0.5 percent by weight to 8 percent by weight, of these trisazo dyes, based on the total weight of the ink. The liquid medium is preferably water or a mixture of water and water-miscible organic solvents. Suitable solvents are given for example in U.S. Pat. No. 4,626,284 and in patent applications GB 2,289,473, EP 0,176,195, EP 0,415,581, EP 0,425,150 and EP 0,597,672.

The present invention will be illustrated in more detail by the following examples without limiting the scope of the claimed compounds in any way.

EXAMPLES

Example 1

The trisazo dye no. 10 was prepared in the following way:
Diazo Component of the Dye
The compound of formula (XXI)

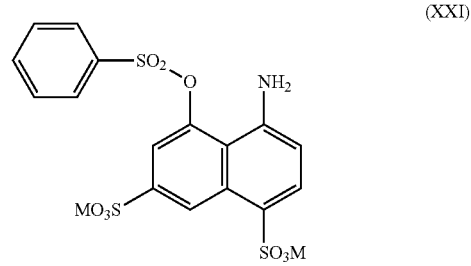

where M represents a hydrogen atom, was prepared from 0.5 moles of 1-amino-8-naphthol-4,6-disulfonic acid and 0.6 moles of benzenesulfonylchloride according to the procedure of example 2-1 described in patent application EP 1'693'422.

Diazo Suspension A 46 g (0.1 moles) of the compound of formula (M) were suspended at room temperature in 360 ml of water, cooled down to a temperature between 0° C. and 5° C. and 25 ml of an aqueous solution of hydrochloric (37%) acid were added drop-wise over a period of 10 minutes under stirring. 25 ml of an aqueous solution (4N) of sodium nitrite were added drop-wise at a temperature between 0° C. and 10° C. The addition terminated, stirring was continued for 1 hour at a temperature between 0° C. and 5° C. The excess of nitrous acid was removed by reaction with sulfamic acid.

Preparation of the Intermediate Dye of Formula (XXII)

The diazo suspension A was added over a period of 30 minutes at an internal temperature between 5° C. and 10° C. to a suspension of 34.7 g (0.1 moles) of 1-amino-8-naphthol-4,6-disulfonic acid (92%) in 100 ml of water under stirring while keeping the value of pH between 2.0 and 3.0 by a simultaneous addition of a solution (20%) of sodium hydroxide. The addition terminated, stirring was continued for 2 hours at a temperature between 0° C. and 5° C.

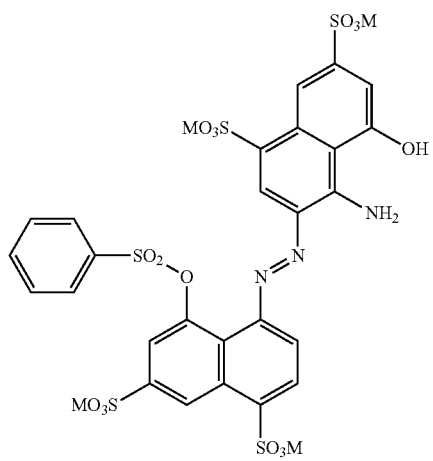

(XXII)

Diazo Suspension B 50.6 g (0.12 moles) of the sodium salt of 2-amino-5-nitrobenzenesulfonic acid (57%) were dissolved in 50 ml of water, The resulting solution was cooled down to a temperature between 0° C. and 5° C. and 30 ml of an aqueous solution (4N) of sodium nitrite were added. 50 ml of an aqueous solution of hydrochloric acid (37%) were added drop-wise over a period of 10 minutes at a temperature between 0° C. and 10° C. under stirring. Afterwards, stirring was continued for 1 hour at this temperature. The excess of nitrous acid was removed subsequently by reaction with sulfamic acid.

Preparation of the Dye of Formula (XXIII)

The intermediate dye of formula (XXII) was not isolated, but directly reacted with the diazo compound B.

The diazo suspension B was added over a period of 30 minutes at an internal temperature between 5° C. and 10° C. to the suspension of the intermediate dye of formula (XXII) under stirring while keeping the value of pH between 5.0 and 7.0 by addition of a solution (20%) of sodium hydroxide. The addition terminated, stirring was continued for 2 hours at a temperature between 0° C. and 5° C. and for 2 hours at room temperature. The formed dye was not isolated, but directly hydrolyzed with sodium hydroxide at a value of pH between 11.0 and 12.0 at a temperature of 90° C. Hydrolysis terminated, the value of pH was lowered to 7.0 and the precipitated dye was filtered off. The raw dye was purified with 300 ml of an aqueous solution (60%) of ethanol. After drying, 39.2 g of the dye of formula (XXIII) were obtained.

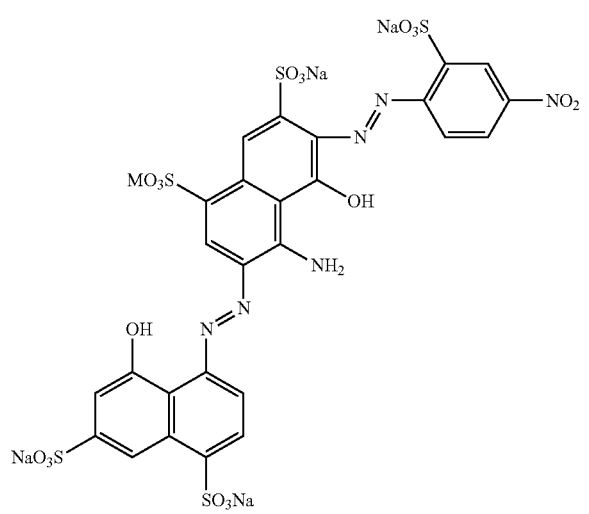

(XXIII)

Preparation of the Trisazo Dye No. 10

15 mmoles of the diazo suspension B were added over a period of 30 minutes at an internal temperature between 5° C. and 10° C. to a homogeneous mixture of 9.9 g (10 mmoles) of the dye of formula (XXIII) in 150 ml of a mixture of water and N-methylpyrrolidone (2:1) while keeping the value of pH between 5.0 and 7.0 by a simultaneous addition of a solution (20%) of sodium hydroxide. The addition terminated, stirring was continued for 2 hours at a temperature between 0° C. and 5° C. and for 2 hours at room temperature. Afterwards, the dark solution was filtered and the filtrate was concentrated with a rotating evaporator. The dye was precipitated by addition of methanol and filtered off. The raw dye was purified with 60 ml of an aqueous solution (80%) of ethanol. After drying, 10 g of dye no. 10 in the form of its sodium salt were obtained.

The trisazo dyes no. 11 to 26 according to the invention may be prepared in a similar way by using appropriate starting materials.

The trisazo dyes no. 30 to 33 according to the invention may be prepared by the method described in patent application EP 10187827.0.

Example of Ink Preparation

The present invention, as far as it relates to inks, is illustrated by the following examples using trisazo dyes according to the invention, listed in Table 1, and trisazo dyes representing the state of the art. For each dye, 100 g of ink were prepared by heating the necessary amount of dye (2 g-9 g), glycerol (5 g), ethylene glycol (5 g), Tergitol 15-S-7 (0.5 g, available from Union Carbide Co., Houston, USA) and a solution of the biocide Mergal K 10N (0.2 g, available from Riedel-de-Haën, Seelze, Germany) together with water to a temperature of 50° C. under stirring for approximately 1 hour. The resulting solution was cooled down to a temperature of 20° C., its value of pH was adjusted to 7.5 and the solution was passed through a Millipore® filter of 0.5 μm pore diameter. The dye quantity was adjusted in such a way that the optical density of the printed image was similar for all the dyes.

Example of Application of Recording Liquids

The recording liquids were subsequently printed with an ink jet printer Canon Pixma IP4000 onto the following recording sheets:

1: ILFORD Premium Plus Instant Dry Glossy Photo RC Paper (silicium dioxide based nanoporous recording sheet, available from ILFORD Imaging Switzerland GmbH, Fribourg, Switzerland)

and

2: ILFORD Galerie Smooth Gloss Paper (aluminum oxide/hydroxide based nanoporous recording sheet, available from ILFORD Imaging Switzerland GmbH, Fribourg, Switzerland)

Tests (A) Light Stability

The printed samples were irradiated using a Weather-Ometer® Ci35A (available from Atlas Material Testing Technology, Chicago, USA) with a 6500 W xenon lamp at a temperature of 20° C. and relative humidity of 50% until an illumination of 20 megalux hours was reached. The density loss was measured with a densitometer Spectrolino®. The percent density loss of initial density gives an indication of the light stability of the dyes on the printed recording sheet.

(B) Color Coordinates

The color coordinates L*a*b* of the printed samples were measured with a spectrophotometer Spectrolino® (available from Gretag Macbeth, Regensdorf, Switzerland).

(C) Stability Against Degradation by Ozone

Colored square patches having a surface area of 1 cm² were printed onto the two recording sheets. The printed samples were dried during 24 hours at relative humidity of about 60%. Then, the optical density of the colored square patches was measured with a Spectrolino® densitometer. Afterwards, the printed samples were stored for a predetermined time in an ozone chamber, model 903 (available from Satra/Hampden, Great Britain) at a temperature of 30° C., a relative humidity of the air of 50% and an ozone concentration of 1 ppm at a velocity of the circulating, ozone containing air of 13 mm/s. After storage, the samples were re-measured. The density differences of these two measurements, expressed as percent of the initial density, are an indication of the amount of dye loss due to the exposure to ozone.

Results

The density losses after an exposure to light of 20 megaluxhours are listed in Table 2.

TABLE 2

| Dye no. | Density loss in percent Recording sheet 1 | Density loss in percent Recording sheet 2 |
|---|---|---|
| 10 | 8.7 | 18.8 |
| 11 | 7.2 | 24.3 |
| 12 | 13.1 | 25.0 |
| 13 | 7.2 | 24.3 |
| 14 | 13.0 | 32.8 |
| 15 | 15.9 | 35.6 |
| 16 | 7.9 | 26.8 |
| 17 | 16.3 | 39.2 |
| 18 | 15.1 | 29.7 |
| 19 | 17.8 | 39.4 |
| 20 | 13.3 | 31.9 |
| 21 | 17.0 | 35.6 |
| 31 | 15.7 | 30.5 |
| (I) | 19.7 | 34 |
| (II) | 39.4 | 62 |

A comparison of the measured density losses of printed samples in Table 2 immediately shows that the trisazo dyes according to the invention have a considerably improved light stability in comparison to the trisazo dyes (I) and (II) representing the state of the art. This means that ink jet printed black images using the trisazo dyes according to the invention fade much less than black images containing the known trisazo dyes representing the state of the art.

The measured values of L*a*b* (illuminant $D_{65}$) of the trisazo dyes according to the invention and the trisazo dyes (I) and (II) representing the state of the art are listed in Table 3.

TABLE 3

| Dye no. | Value of L*a*b Recording sheet 1 | Value of L*a*b Recording sheet 2 |
|---|---|---|
| 10 | 15.4/4.5/−1.9 | 11.9/4.9/−2.3 |
| 11 | 7.8/5.7/−7.4 | 7.2/4.5/−8.0 |
| 12 | 10.8/6.4/−9.6 | 9.8/11.9/−3.0 |
| 13 | 7.8/5.7/−7.4 | 7.2/4.5/−8.0 |
| 14 | 6.3/1.6/−5.8 | 6.3/1.7/−6.2 |
| 15 | 8.9/2.4/−5.6 | 7.8/2.8/−6.9 |
| 16 | 8.1/3.4/−5.8 | 8.6/3.4/−7.1 |
| 17 | 17.0/10.8/−6.5 | 8.2/7.4/−7.7 |
| 18 | 10.2/4.7/−6.6 | 8.3/4.6/−8.1 |

TABLE 3-continued

| Dye no. | Value of L*a*b Recording sheet 1 | Value of L*a*b Recording sheet 2 |
|---|---|---|
| 19 | 7.5/3.6/−8.3 | 7.3/2.3/−7.3 |
| 20 | 9.3/6.3/−7.7 | 8.0/5.5/−8.1 |
| 21 | 12.0/6.5/−6.5 | 10.6/5.6/−7.3 |
| 31 | 10.4/6.4/−5.7 | 9.6/5.4/−6.0 |
| 33 | 13.7/5.1/−4.8 | |
| (I) | 9.1/9.2/−21.5 | 8.6/7.8/−18.1 |
| (II) | 18.9/4.3/−31.7 | 21.0/11.4/−27.0 |

A comparison of the measured L*a*b* values in Table 3 immediately shows that inks containing the trisazo dyes according to the invention give black image regions having lower values of b* in comparison to image regions printed with inks containing the trisazo dyes (I) and (II) representing the state of the art. The trisazo dyes according to the invention are therefore particularly suitable in ink jet printing, because they allow a more neutral reproduction of blacks.

The measured density losses at 80% dye coverage after 96 hours exposure to ozone containing air on recording sheets 1 and 2 are listed in Table 4.

TABLE 4

| Dye no. | Density loss in percent Recording sheet 1 | Density loss in percent Recording sheet 2 |
|---|---|---|
| 10 | 13.9 | 23.8 |
| 11 | 11.4 | 17.3 |
| 12 | 32.0 | 48.3 |
| 13 | 13.8 | 25.0 |
| 14 | 15.0 | 28.2 |
| 15 | 18.3 | 31.5 |
| 16 | 13.6 | 22.7 |
| 17 | 20.7 | 34.5 |
| 18 | 18.0 | 31.3 |
| 19 | 18.7 | 26.4 |
| 20 | 13.3 | 31.9 |
| 21 | 35.2 | 43.8 |
| 31 | 28.4 | 34.0 |
| (I) | 14.2 | 17.1 |
| (II) | 48.5 | 48.2 |

A comparison of the measured stability against degradation by ozone in Table 4 immediately shows that inks containing the trisazo dyes according to the invention of Table 2 have a considerably improved stability against degradation by ozone in comparison to the trisazo dye (II) representing the state of the art.

The foregoing description of various and preferred embodiments of the present invention has been provided for purposes of illustration only, and it is understood that numerous modifications, variations and alterations may be made without departing from the scope and spirit of the invention as set forth in the following claims.

The invention claimed is:
1. Trisazo dyes of general formula (IV)

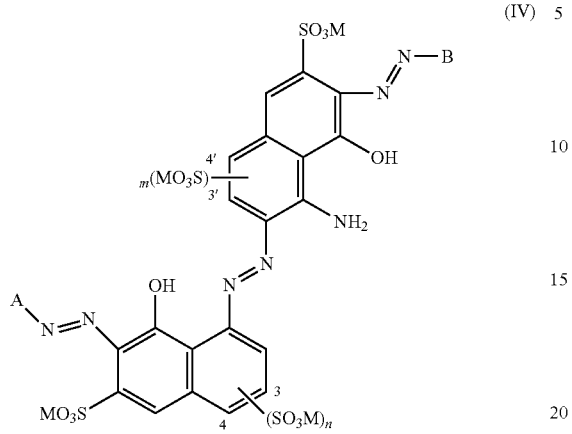 (IV)

and of general formula (V)

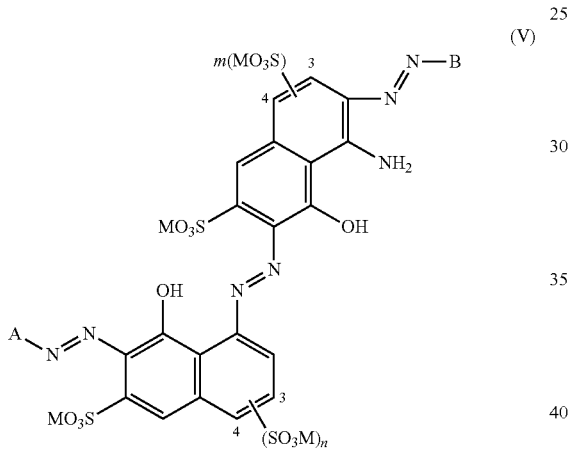 (V)

where
M represents a hydrogen atom, a metal cation or an ammonium cation, which optionally may be substituted by one or more alkyl or substituted alkyl groups each having from 1 to 18 C atoms;
m, n independently are 0 or 1;
A either represents a moiety of general formula (VI)

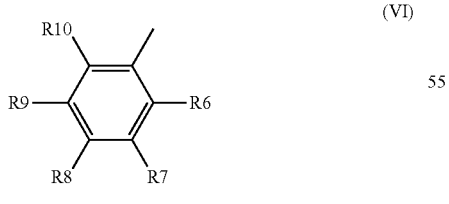 (VI)

where
$R_6$, $R_7$, $R_8$, $R_9$, $R_{10}$ independently represent a hydrogen atom, a $SO_3M$ group, a $NO_2$ group, a COOM group, a CN group, a halogen atom, an ester group, an alkyl or alkoxyl group having each from 1 to 6 carbon atoms, an unsubstituted or substituted amide or sulfonamide group having each up to 12 carbon atoms, wherein the substituents are selected from the group consisting of COOM, OH, $OCH_3$, $NH_2$, Cl, $COOCH_3$ and $COOCH_2CH_3$;
or a moiety of general formula (VII)

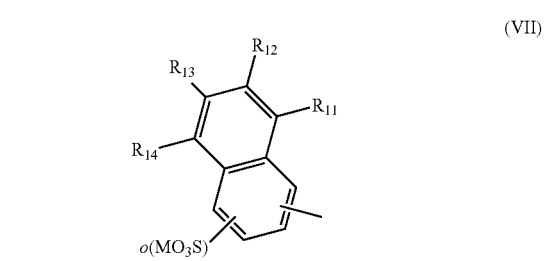 (VII)

where
o is 0 or 1
and
$R_{11}$, $R_{12}$, $R_{13}$, $R_{14}$ independently represent a hydrogen atom, a $SO_3M$ group, a $NO_2$ group, a COOM group, a halogen atom, an ester group, an alkoxyl group having from 1 to 6 carbon atoms, an unsubstituted or substituted amide or sulfonamide group having each up to 12 carbon atoms, wherein the substituents are selected from the group consisting of COOM, OH, $OCH_3$, $NH_2$, Cl, $COOCH_3$ and $COOCH_2CH_3$
and
B either represents a moiety of general formula (VIII)

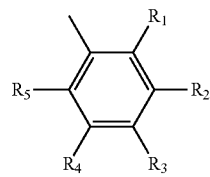 (VIII)

where
$R_1$, $R_2$, $R_3$, $R_4$, $R_5$ independently represent a hydrogen atom, a $SO_3M$ group, a $NO_2$ group, a COOM group, a CN group, a halogen atom, an ester group, an alkyl or alkoxyl group having each from 1 to 6 carbon atoms, an unsubstituted or substituted amide or sulfonamide group having each up to 12 carbon atoms, wherein the substituents are selected from the group consisting of COOM, OH, $OCH_3$, $NH_2$, Cl, $COOCH_3$ and $COOCH_2CH_3$;
or a moiety of general formula (IX)

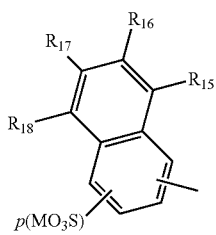 (IX)

where
p is 0 or 1
and
$R_{15}$, $R_{16}$, $R_{17}$, $R_{18}$ independently represent a hydrogen atom, a $SO_3M$ group, a $NO_2$ group, a COOM group, a halogen atom, an ester group, an alkoxyl group having from 1 to 6 carbon atoms, an unsubstituted or substituted amide or sulfonamide group having each up to 12 carbon atoms, wherein the substituents are selected from the group consisting of COOM, OH, $OCH_3$, $NH_2$, Cl, $COOCH_3$ and $COOCH_2CH_3$.

2. Trisazo dyes of general formulas (IV) and (V) according to claim 1, wherein
M, o and p are as defined in claim 1,
$R_1$, $R_2$, $R_3$, $R_4$, $R_5$ independently represent a hydrogen atom, a $SO_3M$ group, a $NO_2$ group, a COOM group, a CN group, a halogen atom, an ester group, an alkyl or alkoxyl group having each from 1 to 6 carbon atoms;
$R_6$, $R_7$, $R_8$, $R_9$, $R_{10}$ independently represent a hydrogen atom, a $SO_3M$ group, a $NO_2$ group, a COOM group, a CN group, a halogen atom, an ester group, an alkyl or alkoxyl group having each from 1 to 6 carbon atoms;
$R_{11}$, $R_{12}$, $R_{13}$, $R_{14}$ independently represent a hydrogen atom, a halogen atom, a $SO_3M$ group or a COOM group;
$R_{15}$, $R_{16}$, $R_{17}$, $R_{18}$ independently represent a hydrogen atom, a halogen atom, a $SO_3M$ group or a COOM group
and
m, n are 1.

3. Trisazo dyes of general formulas (IV) and (V) according to claim 1, wherein
$R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, $R_{18}$, M, o and p are as defined in claim 1;
m, n are 1
and
the sulfonic acid groups are in positions 4 and 4'.

4. Trisazo dyes of general formulas (IV) and (V) according to claim 1, wherein
M, o and p are as defined in claim 1;
$R_1$, $R_2$, $R_3$, $R_4$, $R_5$ independently represent a hydrogen atom, a $SO_3M$ group, a $NO_2$ group, a COOM group, a CN group, a halogen atom, an ester group, an alkyl or alkoxyl group having each from 1 to 6 carbon atoms;
$R_6$, $R_7$, $R_8$, $R_9$, $R_{10}$ independently represent a hydrogen atom, a $SO_3M$ group, a $NO_2$ group, a COOM group, a CN group, a halogen atom, an ester group, an alkyl or alkoxyl group having each from 1 to 6 carbon atoms;
$R_{11}$, $R_{12}$, $R_{13}$, $R_{14}$ independently represent a hydrogen atom, a halogen atom, a $SO_3M$ group or a COOM group;
$R_{15}$, $R_{16}$, $R_{17}$, $R_{18}$ independently represent a hydrogen atom, a halogen atom, a $SO_3M$ group or a COOM group
m, n are 1
and
the sulfonic acid groups are in positions 4 and 4'.

5. Trisazo dyes of general formulas (IV) and (V) according to claim 1, wherein
A is a moiety of general formula (VI) and B is a moiety of general formula (VIII).

6. Trisazo dyes of general formulas (IV) and (V) according to claim 1, wherein
the substituents A and B are identical.

7. Method of preparation of the trisazo dyes according to the invention of general formula (IV) according to claim 1, wherein
an amine of general formula (X),

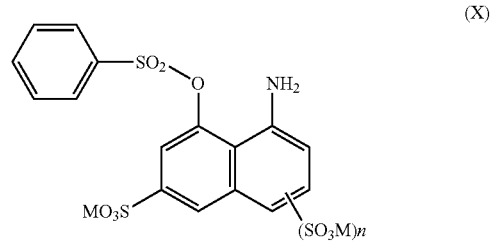

where n and M are as defined in claim 1,
is diazotized and subsequently coupled with a compound of general formula (XI),

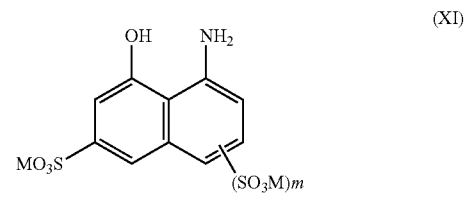

where m and M are as defined in claim 1,
at an acid value of pH situated between about 1.0 and 3.0 under formation of the intermediate dye of general (XII),

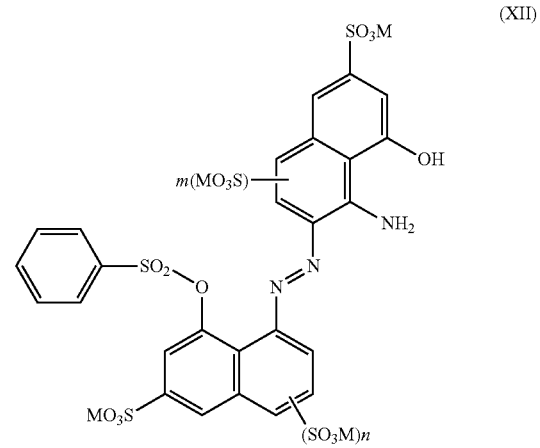

and the intermediate dye of general formula (XII) is further coupled with a diazo compound of general formula (XIII)

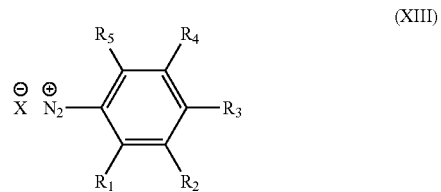

where $R_1$, $R_2$, $R_3$, $R_4$ and $R_5$ are as defined in claim 1 and X is the anion of the acid used during diazotization,
or of general formula (XIV)

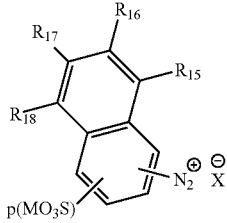

(XIV)

where $R_{15}$, $R_{16}$, $R_{17}$, $R_{18}$ and p are as defined in claim 1 and X is the anion of the acid used during diazotization,
at a slightly alkaline value of pH situated between about 7.0 and 9.0 and hydrolyzed subsequently under basic conditions under formation of the intermediate dyes of general (XV),

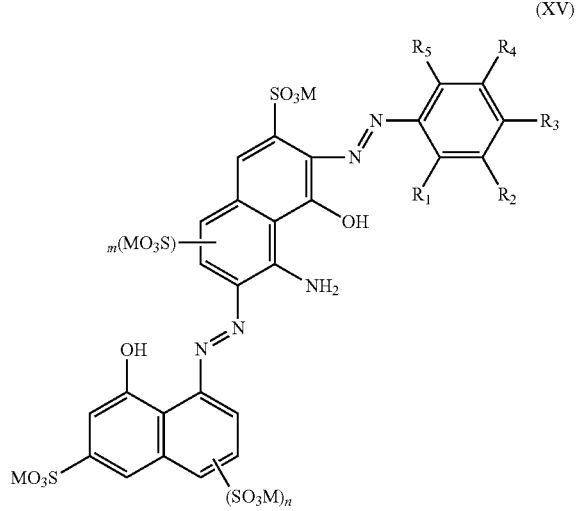

(XV)

or of general formula (XVI)

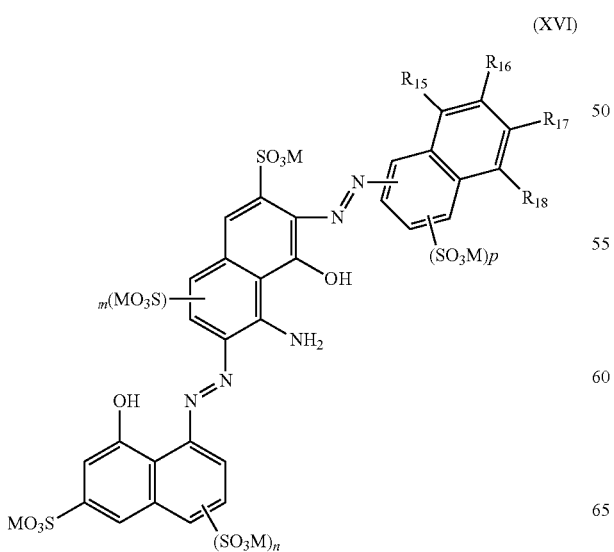

(XVI)

which is subsequently coupled with a diazo compound of general formula (XVII)

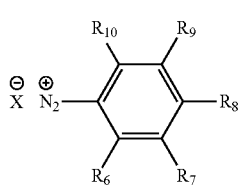

(XVII)

where $R_6$, $R_7$, $R_8$, $R_9$ and $R_{10}$ are as defined in claim 1 and X is the anion of the acid used during diazotization,
or of general formula (XVIII)

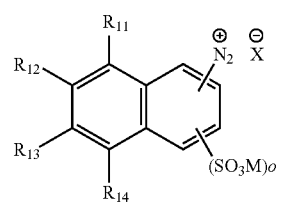

(XVIII)

where o, $R_{11}$, $R_{12}$, $R_{13}$ and $R_{14}$ are as defined in claim 1 and X is the anion of the acid used during diazotization,
at a more or less neutral value of pH situated between about 5.0 and 9.0.

8. Method of preparation of the trisazo dyes according to the invention of general formula (V) according to claim 1, wherein
an amine of general formula (XIX)

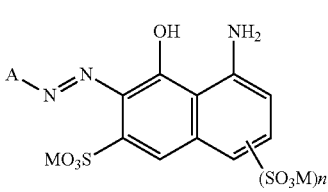

(XIX)

where M, A and n are as defined in claim 1,
is diazotized and subsequently coupled with a compound of general formula (XX)

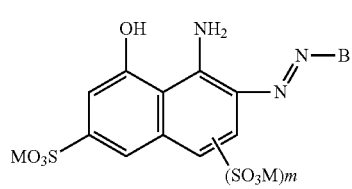

(XX)

where M, B and m are as defined in claim 1,
at a slightly alkaline value of pH situated between about 7.0 and 9.0.

9. Process for recording text and images on recording sheets and for dying and printing of natural or synthetic fiber materials, nanoporous materials, leather and aluminum by applying thereto a black disazo dye or a mixture of black trisazo dyes according to claim 1.

10. Liquid dye preparations containing at least one trisazo dye or a mixture of trisazo dyes according to claim 1.

11. Recording liquids for ink jet printing and for writing utensils containing at least one trisazo dye or a mixture of trisazo dyes according to claim 1.

12. Recording liquids for ink jet printing and for writing utensils containing in addition to at least one trisazo dye or a mixture of trisazo dyes according to claim 1 in addition one or more other dyes.

* * * * *